United States Patent [19]

Baumard et al.

[11] Patent Number: 5,508,242

[45] Date of Patent: Apr. 16, 1996

[54] YTTRIUM OXIDE/TITANIUM OXIDE CERAMIC COMPOSITIONS

[75] Inventors: Jean-Francois Baumard, Limoges; Marcel Boncoeur, Paris; Gilles Gasgnier, Limoges; Louis Minjolle, Courbevoie, all of France

[73] Assignee: Rhone-Poulenc Chimie, Courbevoie, France

[21] Appl. No.: 156,933

[22] Filed: Nov. 23, 1993

Related U.S. Application Data

[63] Continuation of Ser. No. 963,031, Oct. 19, 1992, abandoned, which is a continuation of Ser. No. 698,920, May 13, 1991, abandoned.

[30] Foreign Application Priority Data

May 11, 1990 [FR] France ...................... 90-05888

[51] Int. Cl.$^6$ ............................ C04B 35/50; C04B 35/51
[52] U.S. Cl. ..................... 501/152; 501/126; 423/275
[58] Field of Search ........................ 501/126, 134, 501/152; 423/263, 265, 275; 502/351

[56] References Cited

U.S. PATENT DOCUMENTS

| | | | |
|---|---|---|---|
| 3,545,987 | 12/1970 | Anderson | 501/126 |
| 3,897,358 | 7/1975 | Greskovich et al. | 252/301.1 R |
| 4,040,845 | 8/1977 | Richerson et al. | 106/38.9 |
| 4,115,134 | 9/1978 | Rhodes | 423/263 |
| 4,758,541 | 7/1988 | Tsukuma | 501/126 |
| 4,761,390 | 8/1988 | Hartnett et al. | 501/126 |
| 5,308,809 | 5/1994 | Baumard et al. | 501/152 |

FOREIGN PATENT DOCUMENTS

| | | |
|---|---|---|
| 605351 | 7/1948 | United Kingdom . |
| 2163970 | 3/1986 | United Kingdom . |

*Primary Examiner*—Steven Bos
*Attorney, Agent, or Firm*—Burns, Doane, Swecker & Mathis

[57] ABSTRACT

Ceramic compositions based on yttrium oxide contain a minor amount of a titanium oxide and are readily sintered into dense ceramic shaped articles well adopted for metallurgical applications.

11 Claims, 1 Drawing Sheet

YTTRIUM OXIDE/TITANIUM OXIDE CERAMIC COMPOSITIONS

This application is a continuation of Application Ser. No. 07/963,031, filed Oct. 19, 1992, now abandoned which in turn is a continuation of application Ser. No. 07/698,920 filed May 13, 1991, now abandoned.

BACKGROUND OF THE INVENTION

1. Field of the Invention

The present invention relates to novel compositions useful for the production of ceramic materials, to various processes for the preparation thereof, and to the manufacture of sintered ceramic shaped articles therefrom.

2. Description of the Prior Art

It is known to this art that the use of yttrium oxide by itself as a ceramic powder is unsatisfactory because granular growth occurs too rapidly during the densification thereof. The material must be sintered at a very high temperature, generally above 1,700° C. Without the aid of an external pressure, supplied, for example, by sintering under load or by an isostatic compacting with heating, the density remains limited by the intragranular porosity at about 95% of the theoretical density. This residual porosity and the grain size are detrimental to the desired properties of the final product, especially the mechanical properties thereof.

Thus, need exists in this art for means to accelerate the densification process relative to that of the granular growth. It would then be possible to provide ceramics which have high densities at a lower temperature, final densities closer to the theoretical density and an improved microstructure.

SUMMARY OF THE INVENTION

Accordingly, a major object of the present invention is the provision of improvedly sinterable formulations based on yttrium oxide powder.

Briefly, the present invention features novel compositions based on yttrium oxide, well adopted for the production of sintered ceramic shaped articles therefrom, comprising a major amount of yttrium oxide and a minor amount of at least one titanium oxide, or comprising precursors of such oxides.

DETAILED DESCRIPTION OF THE PREFERRED EMBODIMENTS OF THE INVENTION

More particularly according to the present invention, by "precursor" of yttrium oxide and of titanium oxide are intended any yttrium or titanium compound (inorganic or organic salts, hydroxides, and the like) capable of producing a corresponding oxide phase under the conditions of production of the sintered ceramic shaped article.

By "titanium oxide" is intended titanium dioxide $TiO_2$ and/or a mixed Ti/Y oxide, such as $Y_2TiO_5$ and/or $Y_2Ti_2O_7$.

According to the present invention, it has now unexpectedly been found that the presence of the titanium ion during the sintering of yttrium oxide facilitates and increases the densification of the yttrium oxide at a given sintering temperature.

Stated differently, it is now possible according to the invention to produce a ceramic having a given densification at a sintering temperature which is lower than the sintering temperature of a powder containing only yttrium oxide.

The proportion of the titanium ions, expressed as $TiO_2$, and yttrium ions, expressed as $Y_2O_3$, may vary over wide limits. However, it is advantageous to incorporate same in the following proportions:

(a) from 0.01% to 20% by weight of $TiO_2$,
(b) from 80% to 99.99% by weight of $Y_2O_3$.

A preferred composition is the following:

(a) from 0.02% to 10% by weight of $TiO_2$,
(b) from 90% to 99.98% by weight of $Y_2O_3$.

The compositions of the present invention are well suited for the production of sintered ceramic shaped articles. Such compositions can assume a number of forms which are essentially related to their method of preparation which will be more fully described below.

These compositions may be completely in oxide form, namely, containing yttrium oxide and titanium oxide in the form of a single oxide thereof, optionally in the form of a mixed oxide $Y_2TiO_5$, $Y_2Ti_2O_7$.

The compositions may also be in the form of a mixture of yttrium oxide with a precursor of titanium oxide.

It is also possible for both the yttrium and titanium to be in the form of a precursor thereof, as in the event that a coprecipitate is used.

In all events, the oxide precursor will be converted into its corresponding oxide either during a precalcination stage, if desired, or during the sintering of the composition to produce the sintered ceramic shaped article.

As indicated above, the ceramic compositions, of the invention may be prepared according to different techniques.

In a first alternative embodiment of the invention, entailing a "chamotte" or solid-state technique, an intimate mixture of yttrium oxide with at least one titanium oxide is produced, optionally followed by drying.

The yttrium oxide is per se known to this art and is well described in the literature.

It can be prepared, especially, by heating in air, to a temperature ranging from 400° C. to 1000° C., yttrium hydroxide or certain oxygen-containing salts such as nitrates, sulfates, carbonates, oxalates and acetates (cf. Paul Pascal, *Nouveau Traité de Chimie Minérale* [New Treatise on Inorganic Chemistry], Volume VII).

It is preferable that the yttrium oxide used should be of high purity, preferably higher than 99%.

As regards the titanium oxide, it may be titanium monoxide, titanium sesquioxide or titanium dioxide in anatase or rutile form.

It is also possible to introduce the titanium ions in the form of a mixed yttrium titanium oxide and especially $Y_2TiO_5$ and $Y_2Ti_2O_7$. These are prepared, for example, by formulating a chamotte from a mixture of titanium and yttrium oxides in appropriate proportions at a temperature of approximately 1,300° C.

A mixture of the above mentioned oxides may also be used.

The proportion of the various oxides used is such that the weight percentages described above are provided.

If necessary, the various oxide powders are comminuted such that no hard agglomerates are present. It is desirable that their particle size range should be such that their mean diameter is smaller than or equal to 1 μm, the particle size analysis being carried out using a Sedigraph 5000 D instrument, which measures the distribution of the suspended particles.

By "mean diameter" is intended a diameter such that 50% by weight of the particles have a diameter greater than or smaller than the mean diameter.

In most cases, in order to provide powders of the desired particle size, milling is carried out, which may be performed wet or dry.

Air jet milling can be used, but, in most cases, the milling is conducted conventionally, dry or in suspension in the presence or absence of additives which are usual in these techniques, e.g., milling agents and dispersants.

The milling of the oxide powders is preferably carried out in suspension in water or in an organic liquid such as alcohols, for example methanol, ethanol, n-propanol or isopropanol, or aldehydes or ketones such as, for example, benzaldehyde and, optionally, in the presence of a dispersing agent such as, for example, sodium hexametaphosphate, sodium silicate, triethanolamine, ammonium polyacrylates, glycols such a propylene glycol, diethylene glycol, triethylene glycol, and the like.

Upon completion of this milling operation, a mixture is provided which may contain from 40% to 80% of water or organic liquid. It is then desirable to remove it by drying.

The drying is carried out at a temperature which depends on the liquid to be removed and which in most events ranges from 20° to 400° C., but preferably from 20° to 150° C. This operation can be carried out in air or under reduced pressure, for example at a pressure ranging from 1 to 100 mm of mercury (133.322 Pa and 13332.2 Pa).

It is advantageously carried out by a spraying technique, namely, by spraying it into a stream of hot air whose temperature is selected in the above-mentioned range.

The heating time depends on the amount of liquid to be removed and on the technique employed. It can therefore vary over wide limits, for example from 15 minutes to 48 hours.

In another embodiment of the invention, the ceramic compositions are prepared by a coprecipitation which comprises:

(a) coprecipitating a compound of yttrium and of titanium from a solution of soluble salts of such elements, (b) isolating the coprecipitate thus produced, and (c) optionally, calcining said coprecipitate.

In the first stage of such process of the invention, the yttrium and titanium are coprecipitated.

The starting solutions of soluble salts may be aqueous or organic solutions of inorganic or organometallic compounds.

As regards the organic solvent, one which is miscible with water is selected, preferably an aliphatic alcohol having from 1 to 4 carbon atoms, or a glycol such as, for example, ethylene glycol or diethylene glycol.

The starting solutions of soluble yttrium salts are preferably yttrium nitrate, chloride and/or sulfate solutions.

The yttrium salt is selected such that it does not contain any impurities which can be transferred to the calcined final product. It may be advantageous to use a yttrium salt of a purity which is higher than 99%.

The concentration of the yttrium salt in solution is not critical according to the invention and can vary over wide limits; a concentration ranging from 0.2 to 4 moles per liter is preferred.

Exemplary of the titanium salts, particularly representative are titanium chloride, titanium oxychloride, a titanium alcoholate derived from an aliphatic alcohol having from 1 to 4 carbon atoms such as, for example, titanium tetramethylate, tetraethylate, tetra-n-propylate, tetraisopropylate, tetra-n-butylate and tetraisobutylate. The titanium salt is preferably of high purity, like the yttrium salt.

The concentration of the titanium salt in the solution is not critical and may also preferably vary from 0.002 to 0.04 moles per liter.

The various compounds described above are mixed in any order, the proportions being such that the weight proportions indicated above are provided.

Hydroxides, oxalates and carbonates are especially exemplary compounds of yttrium and titanium which may be precipitated.

The coprecipitation of the hydroxides may be carried out by mixing a solution of the soluble salts with a basic solution.

The basic solution may be, in particular, an aqueous solution of aqueous ammonia or of sodium hydroxide or potassium hydroxide. A solution of aqueous ammonia is preferably used. The normality of such basic solution is also not critical according to the invention; it may vary over wide limits, but it will nevertheless advantageously range from 1 to 5N, preferably 2 to 3N.

The proportion of the basic solution to the solution of soluble salts of yttrium and titanium must be such that the number of base equivalents is higher than or equal to the number of yttrium and titanium equivalents. The pH of the reaction medium is also not critical and may range from about 7 to 14. It advantageously ranges from 9 to 12.

The temperature of the reaction medium preferably ranges from 10° to 95° C.

A mixed coprecipitate of yttrium and titanium hydroxides is produced.

Another precipitation technique entails oxalic coprecipitation.

The solutions of yttrium and titanium salts used therefor have the above-mentioned characteristics.

As regards the precipitating agent, oxalic acid or salt thereof is used, preferably the ammonium salt, in anhydrous or hydrated form.

It may be used in crystalline form, or in the form of an aqueous solution.

In this event, the concentration, expressed as oxalic acid, may range from 0.8 to 3 moles/liter, preferably from 0.3 to 1 mole/liter.

The proportion of the oxalic solution to the solution of soluble yttrium and titanium salts is such that the number of oxalic equivalents is equal to or greater than the number of yttrium and titanium equivalents. An excess of up to 50% of the stoichiometric amount may be employed.

The coprecipitation is carried out at a temperature ranging from 10° to 95° C. and at a pH of 5.5 to 6.

A coprecipitate of yttrium and titanium oxalates is produced.

The second stage of the process entails isolating the coprecipitate from the suspension obtained. This isolation may be carried out by conventional liquid/solid separation techniques such as decanting, draining, filtering and/or centrifuging.

In another embodiment of the process of the invention, the isolated coprecipitate may then be washed with water.

The product obtained after isolation and optional washing may then be dried under the conditions described above. The drying temperature preferably ranges from 20° to 150° C.; the drying time preferably ranges from 15 minutes to 48 hours.

The dried material may then be calcined.

The calcination is generally carried out at a temperature ranging from 400° and to 600° C.

The calcination time advantageously ranges from 30 minutes to 24 hours, for example, and preferably from 1 to 13 hours. The calcination time is related to the temperature and it is proportionally shorter the higher the calcination temperature.

In another embodiment of the invention, the yttrium oxide is impregnated with a solution of at least one titanium salt that decomposes into the corresponding oxide when heated, hereinafter simply designated an oxide precursor.

The above-mentioned soluble salts, converted into an aqueous or organic solution as described above, may be used as the oxide precursors.

The concentration of the oxide precursor solution depends on the solubility of the particular precursor.

In general, the impregnation may be carried out by introducing a soluble titanium salt during the disintegration of the yttrium oxide in an alcoholic medium, for example by introducing an organometallic titanium compound such as, for example, the tetrabutylate or the tetraisopropylate thereof, and by hydrolyzing this organometallic compound by addition of water. The suspended oxide powders are then dried as in the case of the chamotte production technique. Drying and calcination may be conducted under the conditions described above.

The compositions of the invention produced by the various techniques described above are suited for the manufacture of ceramic bodies. Their particle size is preferably such that their mean diameter is smaller than or equal to approximately 1 µm, and having a particle size distribution which is as unimodal as possible.

The compositions described above are fabricated by such known processes as uniaxial or isostatic pressing, or by casting or injection.

The resulting shaped article is then baked to effect the densification thereof which is required to produce the sintered ceramic body according to the invention.

The present invention also features such sintered ceramic shaped article having a high density and which essentially consists of from about 80% to 99.99% by weight of yttrium, expressed as yttrium oxide, and from about 0.01% to 20% by weight of titanium, expressed as $TiO_2$.

The theoretical density of yttrium oxide is 5.031 g/cm³.

The sintered ceramic shaped article obtained from the composition of the invention has a density of at least 4.50 g/cm³, which corresponds to a relative density representing 90% of the theoretical relative density determined as a function of the lattice parameters.

It is advantageous that the sintered ceramic shaped article should have the following composition of from about 90% to 99.98% by weight of yttrium oxide and from about 0.02% to 10% by weight of titanium oxide.

The ceramic shaped article then has a density which is very close to the theoretical density, preferably in excess of 4 78 g/cm³ which corresponds to a relative density representing from 95% to 100% of the theoretical relative density.

The shaped article can be sintered in a heat cycle ranging from room temperature to 1,700° C., preferably from room temperature to 1,550° C. and the temperature is maintained once it attains a value 1,300° to 1,550° C. over a period of time which depends on the temperature and the desired microstructure.

This temperature plateau is further described in the examples to follow.

It should be appreciated that very high densities are obtained at moderate sintering temperatures. A decrease of 300° C. to 400° C. in the sintering temperature is observed, relative to that required for sintering yttrium oxide alone.

Furthermore, the sintered ceramic shaped article exhibits a very good microstructure without exaggerated grain growth.

By way of illustration, this phenomenon is shown in the accompanying FIGS. 1 and 2, which are photomicrographs of various ceramics taken with a scanning electron microscope (using a magnification of 5,000 and 10,000 respectively).

The preparation of such powder is described in Example 1 below.

Figure 1:
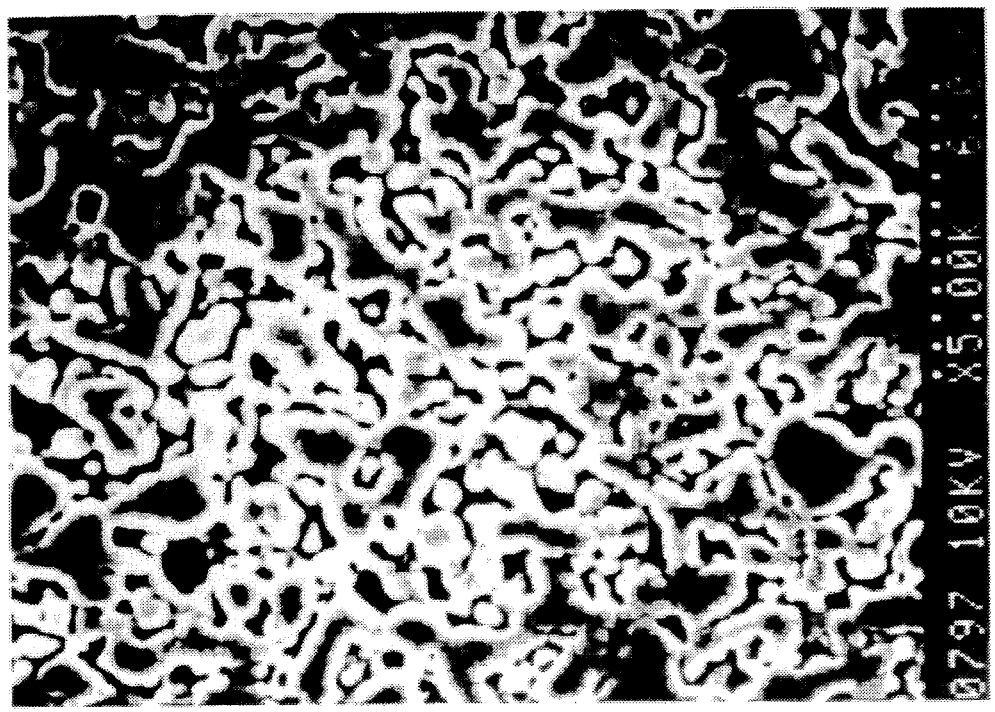
Figure 1 shows the microstructure of a ceramic consisting of yttrium oxide alone, sintered at 1,500° C.
Figure 2:
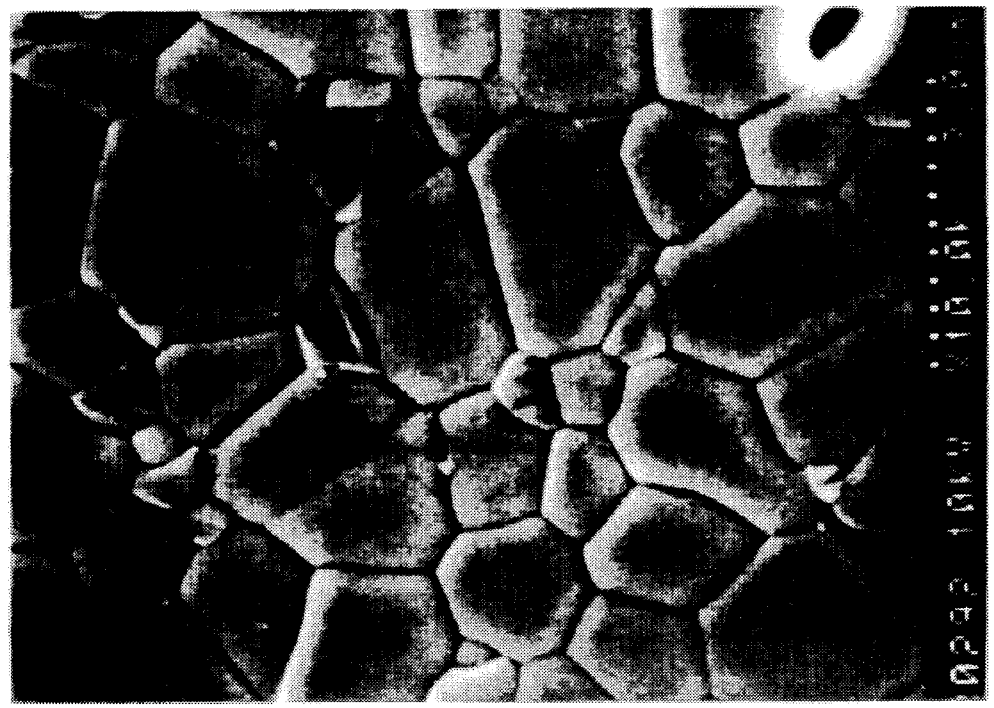
FIG. 2 shows the microstructure of a powder containing 99% of $Y_2O_3$ and 1% of $TiO_2$ sintered at 1,500° C.

From a comparison of FIG. 1 with FIG. 2, it will be seen that the presence of the aforementioned sintering additives appreciably improves the microstructure of the ceramic final product.

As a result of their desirable properties, the compositions of the invention are especially useful as raw materials in the manufacture of ceramics, as reinforcing agents for alumina and as milling media. They can also be used in the field of metallurgy, especially for the production of crucibles and filters for liquid metals.

In order to further illustrate the present invention and the advantages thereof, the following specific examples are given, it being understood that same are intended only as illustrative and in nowise limitative.

In said examples to follow, all parts and percentages are given on a weight basis.

EXAMPLES 1 to 3:

In these examples, the composition of the invention was prepared by intimately admixing powdered yttrium oxide and titanium oxide.

The following powders were mixed in ethanol, introduced in an amount which was equivalent to the charge, in a zircon ball mill (Attritor) rotating at 400 revolutions/minute:

(i) a yttrium oxide powder, marketed by Rhône-Poulenc, having a mean particle diameter of 3.4 µm, measured in the Sedigraph, and having a purity of 99.99% (luminophor grade), (ii) anatase titanium oxide $TiO_2$ powder having a mean particle diameter of 8.5 µm and having a purity higher than 99%.

First, 50 g of yttrium oxide were introduced into the mill and were milled for one hour in ethanol, in a proportion of 60%.

Titanium oxide was then added in a suitable amount reported in Table I and a combined milling was then carried out for 30 minutes.

The ethanol and the water were removed by evaporation in an evaporator under a reduced pressure, provided by a water pump.

A composition was obtained in the form of powder, which was subjected to a screening operation, enabling agglomerates larger than 400 µm in diameter to be removed.

It was then pelleted at a pressure of 150 MPa and subjected to the sintering operation.

The temperature was increased progressively at 20° C./min up to 1,000° C. and then at 3° C./min up to the sintering temperature of 1,500° C.; such temperature was maintained for 3 hours.

The results are reported in Table I:

TABLE I

| Example | 1 | 2 | 3 |
| --- | --- | --- | --- |
| % $TiO_2$ | 1 | 3 | 10 |
| d | 4.83 | 4.88 | 4.93 |
| dr % | 96% | 97% | 98% |

In Table I, d represents the relative density of the ceramic obtained, measured by Archimedes' technique using demineralized water as the liquid, and dr represents the relative density expressed as a percentage of the theoretical density calculated on the assumption of a two-phase $Y_2O_3/Y_2TiO_5$ mixture.

The resulting ceramic had a good microstructure.

It was composed of grains which were substantially of the same shape and exhibited a uniform distribution of their particle size, which varied from 1 to 5 µm after sintering at 1,500° C.

EXAMPLES 4 and 5:

In these examples which follow, a composition containing yttrium oxide and titanium oxide was prepared by an impregnation technique.

50 g of yttrium oxide were mixed with 50 cm³ of ethanol. 0,425 g of titanium tetra-n-butylate were then added, corresponding to 0.2% of $TiO_2$.

The entire mass was then subjected to a milling operation for 15 minutes in a zircon ball mill (Attritor) rotating at 200 revolutions/minute.

10 cm³ of distilled water were then added and the milling operation was continued for 1 hour, 45 minutes.

The ethanol and the water were removed by evaporation in an evaporator under reduced pressure, provided by a water pump.

A composition was obtained in the form of a powder, which was screened at 100 µm.

It was then pelleted at a pressure of 150 MPa and subjected to a sintering operation.

The temperature was increased progressively at 15° C./min up to 1,100° C. and then at 5° C./min up to the sintering temperature of 1,500° C.; such temperature was maintained for 3 hours.

The results obtained are reported in Table II:

TABLE II

| Example | 4 | 5 |
|---|---|---|
| % of $TiO_2$ | 0.2 | 1 |
| d | 4.83 | 5.01 |
| dr % | 96.0% | 99.5% |

EXAMPLES 6 and 7:

In these examples, the composition of the invention was prepared from yttrium oxide and $Y_2TiO_5$.

The combined milling of $Y_2O_3$ and $Y_2TiO_5$, which were introduced in the proportions indicated in Table III, was carried out for 2 hours in ethanol in a zircon ball mill rotating at 200 revolutions/minute.

The ethanol and the water were removed by evaporation in an evaporator under reduced pressure, provided by a water pump.

A powder was obtained and was screened at 100 µm.

It was then pelleted at a pressure of 150 MPa.

The sintering was carried out under the conditions of Examples 4 and 5 (sintering temperature=1,500° C.).

The results obtained are reported in Table III:

TABLE III

| Example | 6 | 7 |
|---|---|---|
| % of $TiO_2$ | 0.2 | 1 |
| d | 4.79 | 5.02 |
| dr % | 95.2% | 99.8% |

While the invention has been described in terms of various preferred embodiments, the skilled artisan will appreciate that various modifications, substitutions, omissions, and changes may be made without departing from the spirit thereof. Accordingly, it is intended that the scope of the presence invention be limited solely by the scope of the following claims, including equivalents thereof.

What is claimed is:

1. A sintered ceramic shaped article comprising 80% to 99.99% by weight of $Y_2O_3$ and 0.01% to 20% by weight of a titanium oxide, the sintered shaped article having a density greater than 4.5 g/cm³.

2. The sintered ceramic shaped article as defined by claim 1, said titanium oxide comprising $TiO_2$, $Y_2TiO_5$, $Y_2Ti_2O_7$ or mixture thereof.

3. The sintered ceramic shaped article as defined by claim 1, comprising sintered powdered yttrium oxide and titanium oxide having a purity which is higher than 99%.

4. The sintered ceramic shaped article as defined by claim 3, said powdered yttrium oxide and titanium oxide having a particle size such that the mean diameter thereof is less than or equal to 1 µm.

5. The sintered ceramic shaped article as defined by claim 1, said titanium oxide comprising a titanium monoxide, a titanium sesquioxide, a titanium dioxide in anatase or rutile form, or a mixed oxide $Y_2TiO_5$, and/or $Y_2Ti_2O_7$.

6. The sintered shaped article as defined by claim 1, produced by sintering the yttrium oxide and the titanium oxide at 1300° to 1700° C.

7. The sintered shaped article as defined by claim 1, produced by pressing and sintering the yttrium oxide and the titanium oxide at 1300° to 1700° C.

8. The sintered ceramic shaped article as defined by claim 1, having a density greater than 4.78 g/cm³.

9. A sintered ceramic shaped article comprising 80% to 99.99% by weight of $Y_2O_3$ and 0.01% to 20% by weight a titanium oxide the sintered ceramic shaped article having a density greater than 4.5 g/cm³ which corresponds to a density of at least 90% of the theoretical density.

10. The sintered shaped article as defined by claim 9, produced by sintering the yttrium oxide and the titanium oxide at 1300° to 1700° C.

11. The sintered shaped article as defined by claim 9, produced by pressing and sintering the yttrium oxide and the titanium oxide at 1300° to 1700° C.

* * * * *